Aug. 7, 1956 — B. W. POLLARD ET AL — 2,757,864
INFORMATION TRANSLATING APPARATUS
Filed Aug. 28, 1951 — 7 Sheets-Sheet 1
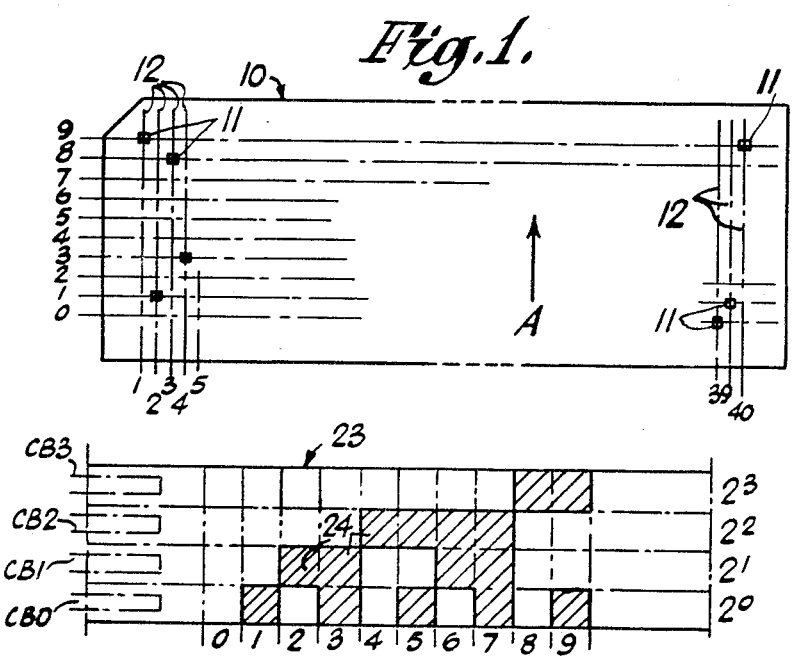
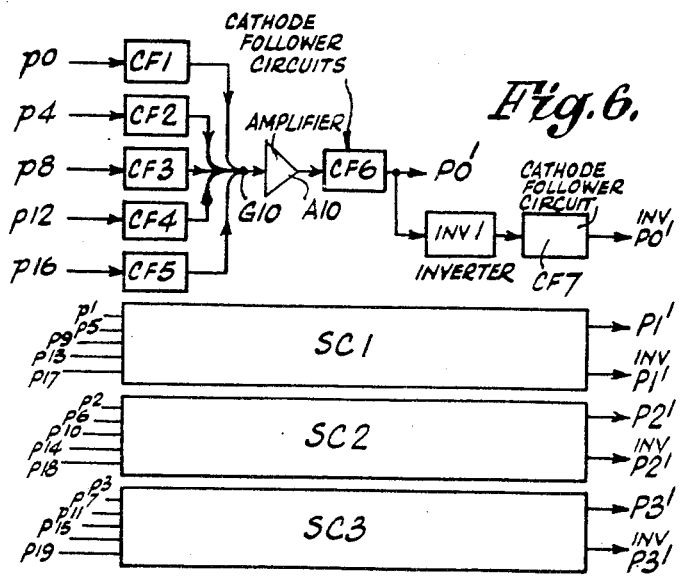
INVENTORS:
B. W. POLLARD &
R. STUART-WILLIAMS
ATTORNEYS:
Moore and Hall

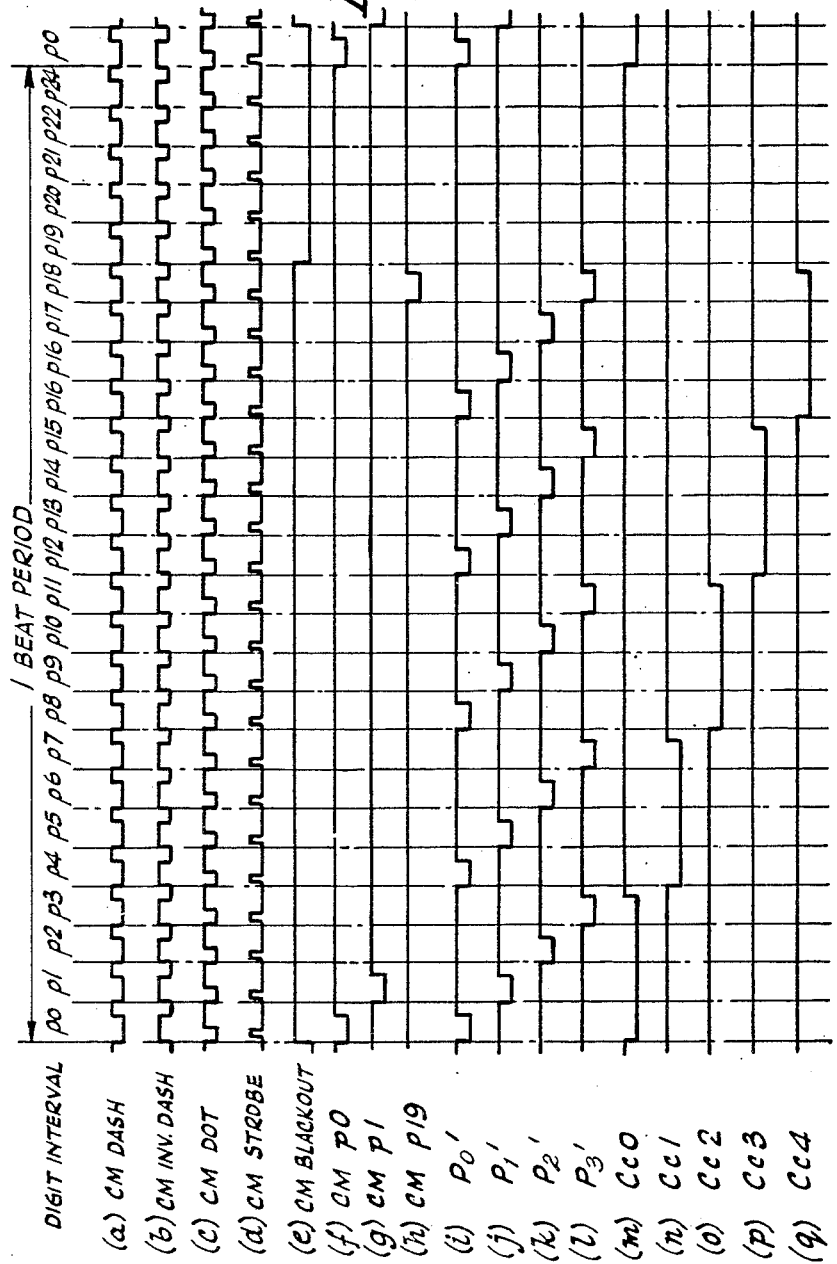

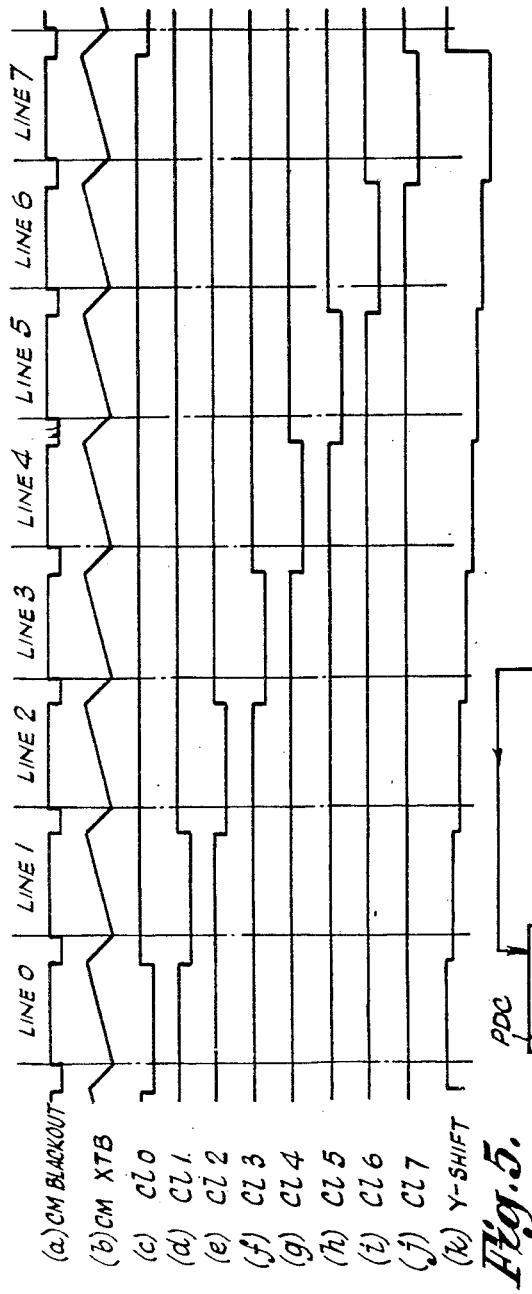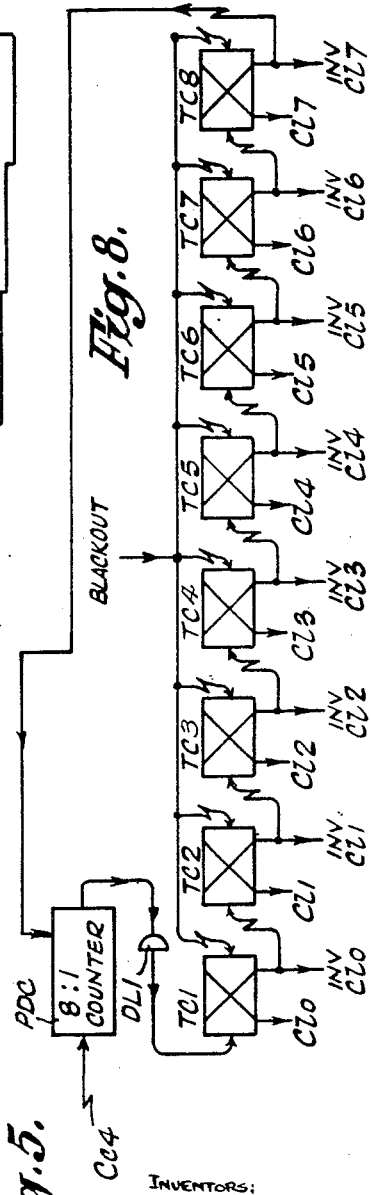

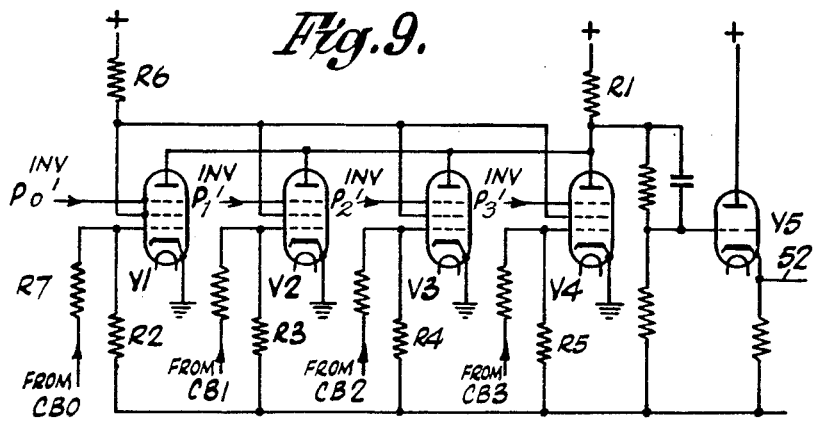
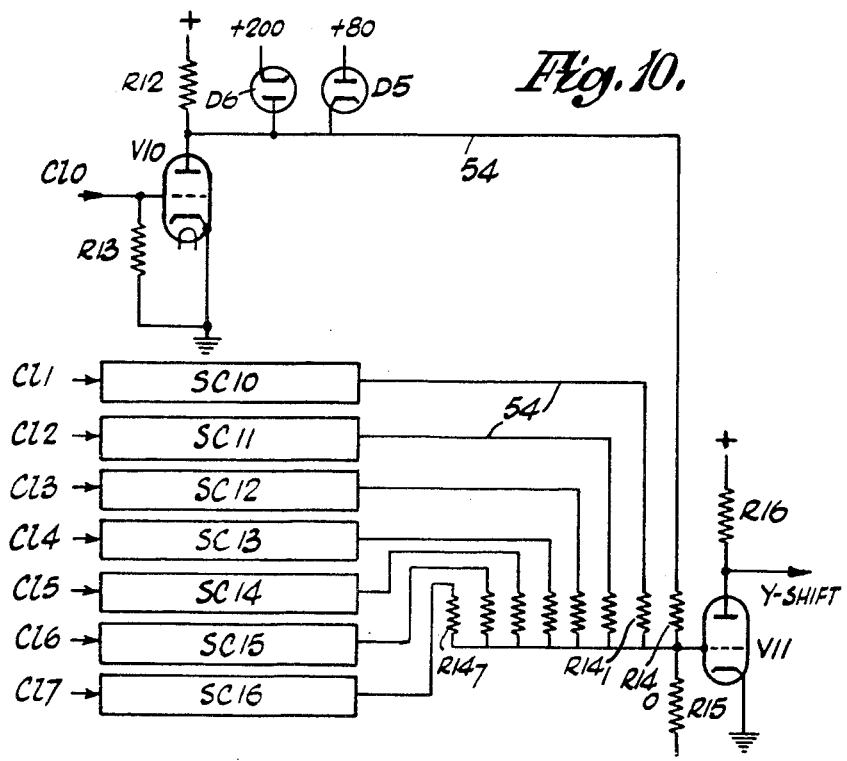

United States Patent Office 2,757,864
Patented Aug. 7, 1956

2,757,864
INFORMATION TRANSLATING APPARATUS

Brian Watson Pollard and Raymond Stuart-Williams, Hollinwood, Lancashire, England, assignors to National Research Development Corporation, London, England, a corporation of Great Britain Application August 28, 1951, Serial No. 244,055

Claims priority, application Great Britain August 30, 1950

9 Claims. (Cl. 235—61.6)

This invention relates to means by which information recorded in the form of markings or punchings at different positions on a card or the like, e. g. a card of the so-called Hollerith type, may be converted into electric signals suitable for use in operating electric apparatus such as a computing machine, or to the converse means by which such signals may be used to produce an appropriately marked or punched card or the like.

The invention is particularly, although by no means exclusively, applicable to electrode digital computing machines of the kind using the binary system of numbers and operating in the serial mode. Examples of such machines and of devices adapted for use therewith are given in the specifications of the following copending patent applications and as these will be referred to subsequently they have each been alloted a reference letter which will alone be used hereinafter.

Application No. 50,136, filed September 20, 1948, by F. C. Williams et al., for Improvements in or Relating to Electrical Storage Apparatus, hereinafter referred to as specification A.

Application No. 124,192, filed October 28, 1949, by F. C. Williams et al., for Improvements in or Relating to Electrical Information Storage Apparatus, hereinafter referred to as specification B.

Application No. 93,612, filed May 16, 1949, by F. C. Williams et al., for Improvements in or Relating to Information Storage Means, hereinafter referred to as specification C.

Application No. 141,176, filed January 30, 1950, by F. C. Williams et al., for Electronic Digital Computing Devices, hereinafter referred to as specification D.

Application No. 165,434, filed June 1, 1950, by F. C. Williams et al., for Improvements in or Relating to Electronic Digital Computing Devices, hereinafter referred to as specification E.

Application No. 226,761, filed May 17, 1951, by F. C. Williams et al., for Electronic Digital Computing Machines, hereinafter referred to as specification F.

In the aforesaid form of recording card, hereinafter called a "record card," the item of information stored thereon has the value or character of each component digit or element defined by the position of a marking or punching in a column of alternative positions for such marking or punching at least equal in number to the number of different values or characters assignable to such digit or element, there being a plurality of such columns one for each of the maximum number of component elements or digits of the information item, arranged side-by-side with the similar column value or character positions hereinafter called "digit-points" in transverse alignment. For example, the standard Hollerith record card, which uses the decimal system for representing numbers, comprises 80 columns, one for each of the separate digits of an 80-digit number and each column contains at least 10 separate digit-points representing respectively the different possible values, 0 to 9, for each digit. The value of each digit of the number is defined by the position of a single punch hole in the appropriate one of said columns.

A major problem in the conversion of information between punched or marked card form and electric signal form for use in computing machines and the like resides in the large difference in speed between the maximum rate of transmission of a card through a card reading or a card marking or punching mechanism and the digit signalling speed of the corresponding electric signals within the machine; whereas the usual card reading operation requires a time interval which is of the order of 400 milliseconds, the digit-interval time in a serial mode computing machine as described in said specifications D, E and F is only 10 micro-seconds while the time required to signal the binary equivalent of 80 decimal digits (i. e. the contents of one record card) would be of the order of 240×10 microseconds=2.4 milliseconds only. A further difficulty arises from the fact that the reading of such a record card effectively presents the respective digit values simultaneously or in parallel form whereas computing machines such as those mentioned above are more conveniently supplied with the respective signals in serial form.

The object of the present invention is to provide an improved arrangement by which conversion in either direction may be achieved and which, at the same time, affords enhanced reliability and accuracy in the conversion operation.

In accordance with the present invention use is made of a suitable memory or storage device for instance, an electrostatic type of storage device as described in specifications A and B, in which a separate recording position for each component or digit element of the information item to be converted is successively and repeatedly made accessible in a continuous manner in synchronism with the facility of effecting a testing, punching or marking operation successively in each of the columns of a record card as the transverse level of a chosen one of the alternative digit-point positions of such columns, such testing, punching or marking facility being accompanied by the provision of a locally generated electric signal appropriate to the value or character of the transverse digit-point level being dealt with and repeated once for every column in synchronism with the time of access to the related recording position in said store and the related facility for effecting a testing, punching or marking operation, each of the different transverse digit-point levels on said columns being dealt with in turn until said facility of effecting said testing, punching or marking operation has been made available to every desired information-defining position on the card.

For the conversion of the card recorded information into electric signals the presence of a punching or marking at a tested position is arranged to cause the transmission of the simultaneously available and locally generated electric signal into the store where it is thereafter retained in its appropriate column-defining position until after all of the available positions of the card have been dealt with whereupon such store holds an electric signal equivalent of the card-recorded information for subsequent reading out into the associated computing or like machine.

For the converse operation of converting an electric signal into a punched or marked card record, the signal is first placed in the store and each separate part thereof in each separate recording position is compared with the simultaneously occurring and locally generated signals for each of the different transverse digit-point levels in turn, as the relative position of the card with respect to the punching or marking means is appropriately changed in synchronism therewith, equivalence of any separate part of the stored signal with the related locally-generated signal being arranged to cause either immediate or subsequent actuation of the punch or marking means to provide a punching or marking of the card at a position which is representative of the character or value of the particular component element or digit of the stored signal which is being dealt with at that particular instant.

In order that the various features of the invention may be properly and more readily understood a description of two embodiments thereof will now be given in conjunction with the accompanying drawings in which:

Fig. 1 is a plan view of one form of punched record card usable with the described embodiments of the invention.

Fig. 3 is a developed view of the peripheral surface of a commutator device used in the embodiment of Fig. 2 for controlling the form of the locally-generated signal.

Figs. 4 and 5 each comprise a series of diagrams illustrating a number of electric waveforms existing within the conversion arrangements of the invention and in the associated computing machine.

Fig. 6 is a more detailed block diagram of the arrangements provided for generating the 'P'-pulse waveforms used in the machine and shown in Fig. 4.

Figure 7:
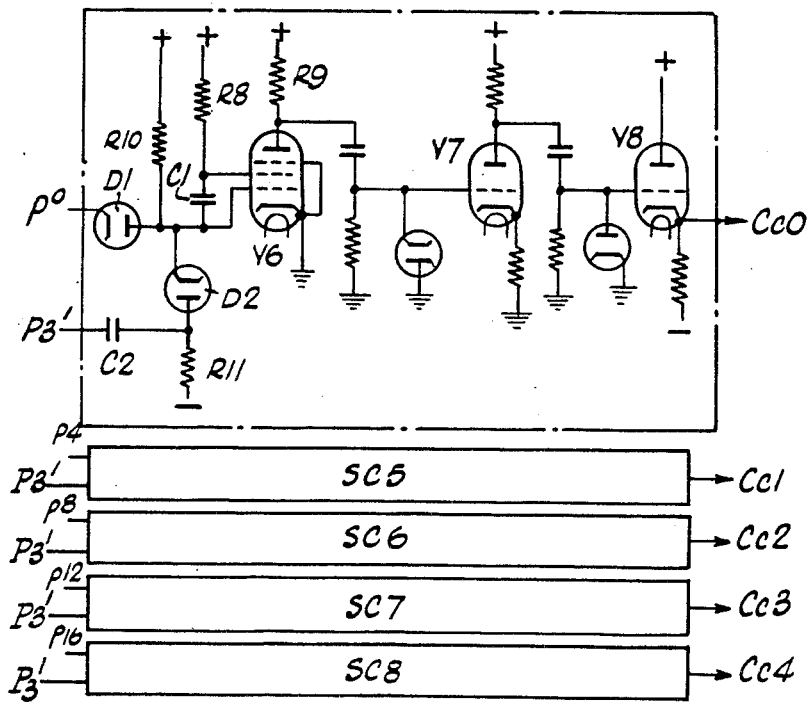

Fig. 7 is a more detailed circuit diagram of the arrangements provided for generating the character identifying or Cc counter waveforms shown in Fig. 4.

Fig. 8 is a diagram, similar to Fig. 6, of the arrangements provided for generating the line counting or Cl waveforms shown in Fig. 5.

Fig. 9 is a circuit diagram of the dynamiciser or local signal generator.

Fig. 10 is a diagram showing the Y-shift or beam deflection circuits for the cathode ray tube of the auxiliary store.

Figure 2:
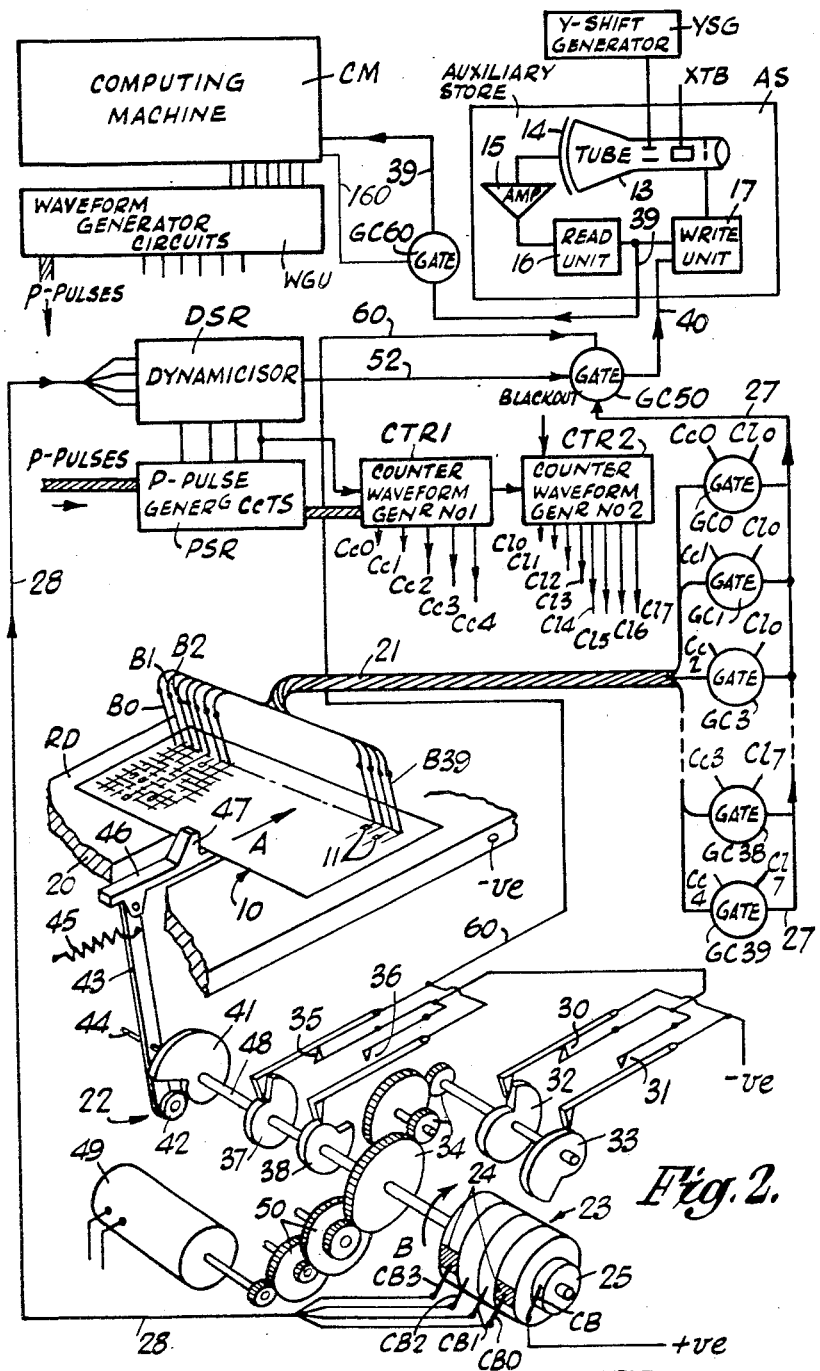
Fig. 2 is a mainly diagrammatic representation of an input mechanism for an electronic digital computing machine of the general type described in said specifications D, E and F and using the record card form shown in Fig. 1.
Figure 11:
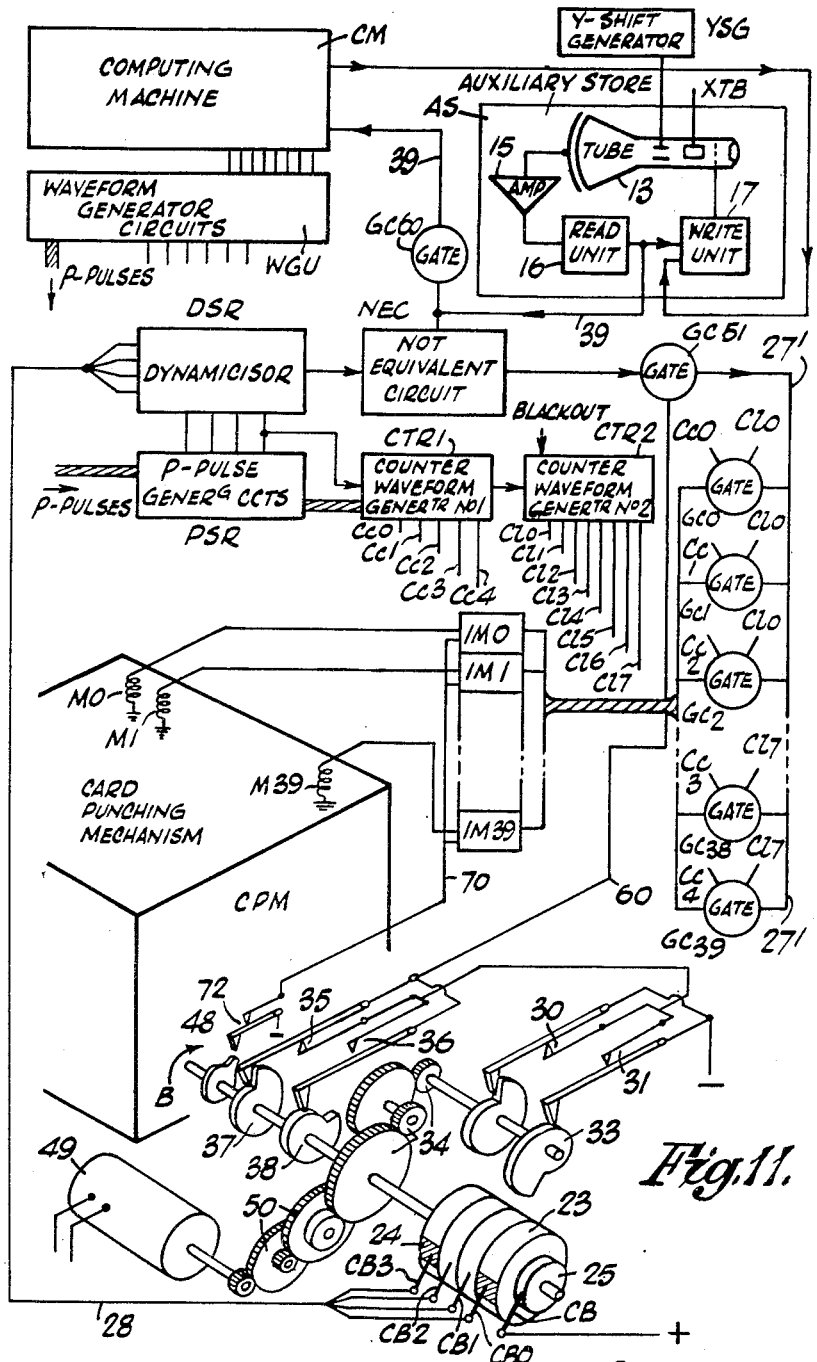

Fig. 11 is a diagrammatic representation, similar to Fig. 2, showing an output mechanism for use with a similar computing machine and using a record card of the form shown in Fig. 1.

Figure 12:
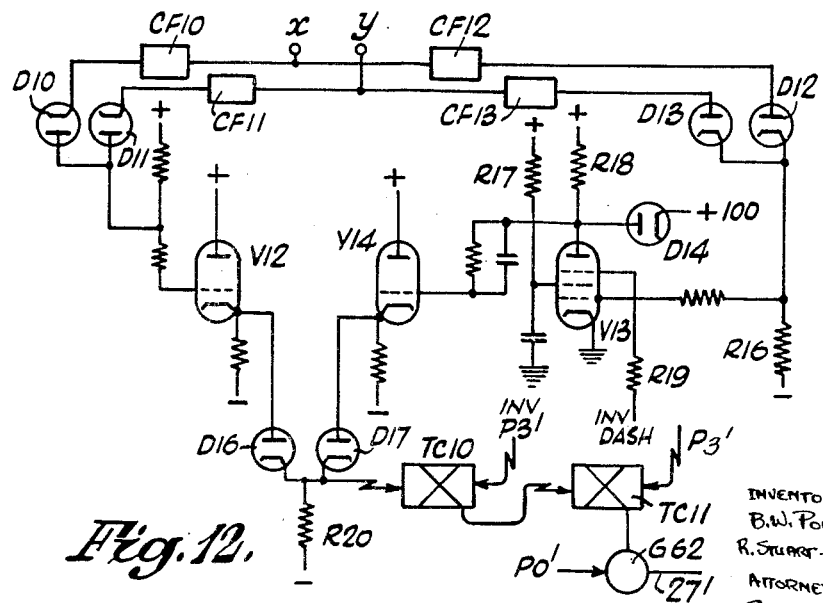

Fig. 12 is a more detailed circuit diagram of the "not-equivalent" circuit and associated elements of the arrangement of Fig. 11.

Fig. 1 illustrates a simple form of record card suitable for use with the illustrated embodiment of the present invention which is concerned with its application to an electronic digital computer of the general kind described in said specifications D, E and F and which operate in the serial mode and with numbers in binary digital form.

The card is designed to record thereon a single number of forty decimal digits defined by the vertical position of punch holes 11 one in each of forty side-by-side columns 12. There are ten separate digit-points in each column 12 significant respectively of the possible decimal values "0" to "9" of each digit. All the digit-points of common value in each of the columns 12 are in transverse alignment as shown, the transverse level of the digit "9" being the first to be presented to the reading mechanism when the card is advanced in the direction of the arrow A.

Fig. 2 illustrates the application of the invention to an input mechanism for a computing machine of the general type described in said specifications D, E and F. Such machine will not be described in detail and is accordingly represented only in block form at CM with its associated waveform generating circuits WGU which control the operating rhythm of the machine and certain of the waveform outputs which are employed in the control of the input mechanism in view of the necessity of coordinating the operation of the input mechanism with the computing machine which it feeds. These waveforms include those shown in diagrams (a), (b), (c), (d), (e), (f), (g) and (h) of Fig. 4 and (a) and (b) of Fig. 5; that of diagram (a), Fig. 5, being the waveform of Fig. 4 (e) redrawn to a different scale. The means for generating these various waveforms is described in greater detail in the aforesaid reference specification E for a 40-digit word length machine having a 45 digit interval beat period. As explained later, the present machine is designed to use a word length of only 20 digits and a beat period of 24 digit intervals. The waveform generating arrangements of such reference specification E are accordingly modified slightly by alteration of the division ratio of the divider circuit DV1 of Fig. 1b of such reference to a value of 4 to 1, by alteration of the division ratio of the divider circuit DV2 thereof to a value of 6 to 1 and by the provision of only twenty instead of forty trigger circuits in the p-pulse generator PPG. The inverse version of the Dash waveform, Inv. Dash, illustrated in Fig. 4(b) of the present documents is derived from the same generator (DSPG, Fig. 1b of reference specification E) as that which suuplies the Dash waveform of Fig. 4(a), such generator being a conventional mono-stable trigger circuit as described, for instance, in M. I. T. Radiation Laboratory Series, vol. 19, "Waveforms" (published by McGraw-Hill) on page 168, Fig. 5.10, and accordingly providing two mutually antiphase outputs from its respective valve anodes.

The machine CM operates with a basic rhythm of 10 microsecond digit intervals with a beat or minor-cycle period of 25 digit-intervals i. e. 250 microseconds of which the first 20 digit intervals are used for signalling, in the serial mode, 20-digit numbers or words with each "1" digit expressed as a negative-going Dash pulse during the first 6 microseconds of any digit-interval and the digit "0" expressed by the absence of such a Dash pulse from the related digit interval.

Fig. 4 (a) illustrates the Dash waveform available from the machine waveform generating circuit WGU while Fig. 4 (b) illustrates the inverted version of the same waveform, known as the Inv. Dash waveform. These waveforms are continuous and are derived directly from the master oscillator or clock of the machine through a suitable pulse generator circuit as described in said reference specifications E or F.

Fig. 4 (c) illustrates the Dot waveform which is used, in the manner described in said prior specifications, in the operation of the cathode ray tube storage devices and comprises a series of 2 microsecond negative-going pulses coincident in timing with the first 2 microseconds of each Dash pulse and derived from the same master oscillator or clock of the machine through a suitable pulse generator circuit as described in said reference specifications E or F.

Fig. 4 (d) illustrates the Strobe waveform used, in the manner described in said prior reference specifications B, D, E or F for examining selected small parts of pulse signals in the machine through the intermediary of a gating circuit arrangement controlled so as to be opened by the Strobe pulses. The waveform comprises a series of 1½ microsecond positive-going pulses whose leading edges are slightly delayed with respect to those of the Dash and Dot waveforms and which are likewise derived from the master or clock of the machine through a suitable pulse generating circuit as described in said reference specifications D or E.

Fig. 4 (e) and Fig. 5 (a) illustrate the Blackout waveform which controls the scanning/flyback periods of the cathode ray tube stores, the positive-going period, covering the first 20 digit-intervals p0–p19 of each beat, being that when the tube beam is operative and moving in the X direction and the remaining negative-going period covering the last 5 digit-intervals p20–p24 of each beat, being, that in which the tube beam is blacked-out and executing its fly-back movement in readiness to commence the next line scan during the next beat.

Fig. 5 (b) illustrates the related X time base or XTB waveform used for controlling the line scanning or X movement of the tube beams.

For the purpose of selecting any one of the active digit-intervals $p0$–$p19$ in each beat the machine is provided with a series of $p$-pulse waveforms comprising, on separate leads, an isolated Dash pulse in each $p0$ digit-period, in each $p1$ digit-period and so on. Figs. 4 (*f*), (*g*) and (*h*) illustrate the $p0$-pulse, the $p1$-pulse and the $p19$-pulse waveforms of this series.

The input mechanism comprises broadly a reading device RD through which the record cards 10 are fed mechanically to produce, by electric contacts established through the punched holes 11 therein, a series of output potentials which are applied to the related gate circuit of a series of gate circuits GC0 . . . GC39. In synchronism with the movement of the card 10 through the device RD a commutator 23 controls the operation of a dynamicisor DSR to cause the continuous emission therefrom of a series of four-digit binary signals representing the binary equivalent of the particular digit-point then being read at the reading device RD. These four-digit "character" signals, as they will hereinafter be called, are obtained by suitable selection of the $p$-pulse waveforms from the waveform generating circuits WGU associated with the main machine CM so that they will be in proper time synchronism with the rhythm of the latter. These four-digit character signals from the dynamicisor DSR are applied to a gate circuit GC50 which governs their further passage to the write input of an auxiliary store AS which is of similar form to those used in the machine CM and from which information can subsequently be transferred to such machine. The auxiliary store has forty separate storage locations therein, a unique one for each of the columns 12 of the card 10 and each capable of receiving one four-digit character signal. Each of these storage positions is made available sequentially during each operative scanning cycle of the store. In order to allow the onward passage of any locally generated four-digit character signal provided by the dynamicisor DSR only at that correct instant of the operative scanning cycle which will ensure its entry into the assigned unique storage location a series of further controlling potentials for the gates GC0 . . . GC39 are derived from two counter waveform generators CTR1 and CTR2 described in detail later with reference to Figs. 7 and 8. The first generator CTR1 provides five different output waveforms $Cc0$, $Cc1$, $Cc2$, $Cc3$ and $Cc4$, shown in diagrams (*m*), (*n*), (*o*), (*p*) and (*q*) respectively of Fig. 4, and each comprising an active (negative-going) pulse period which covers a different 4-digit period of each line scanning or beat cycle of the store AS. Each pulse period thus covers a different one of the five 4-digit character storage locations in any one scanning line of the store. The second generator CTR2 provides eight different output waveforms $Cl0$, $Cl1$, $Cl2$ . . . $Cl7$, shown in diagrams (*c*), (*d*) . . . (*j*) of Fig. 5, and each comprising an active (negative-going) pulse period which covers a different one of the eight line scanning or beat cycles of the store AS. Each pulse period thus covers a different one of the eight groups, each containing 5 character storage locations of 4 digits each, which are included in the complete scanning raster of the storage tube in store AS. By the application of different combinations of the output waveforms from these counter waveform circuits, the gate GC0 is opened only during the time when the first of the forty character storage locations are available, the gate GC1 is opened only during the time when the second storage location is available and so on. Thus gate GC0, Fig. 2, is controlled as shown by the $Cc0$ and $Cl0$ waveforms and as accordingly opened only during the time of the first four digit intervals $p0$, $p1$, $p2$, $p3$ of the first scanning line, line 0 of the raster scanning cycle of the store. The four digit storage locations which are available during this time period accordingly constitute the first of the forty separate (4-digit) character storage locations. The gates GC0 . . . are conventional three input coincidence gates, e. g. of the multiple diode type as described by C. H. Page in "Electronics," September 1948, pages 110–118, in particular Fig. 2F, page 112. Since the locally-generated number signal provided by the dynamicisor DSR is the binary representation of the particular digit-point at which contact is then being established through the record card 10 each character storage location in the auxiliary store AS will at one time or another receive the appropriate character signal from the dynamicisor DSR due to the presence of an output potential from the reading device RD at the related gate GC in coincidence with the opening of that gate by the appropriate combination of waveforms from the circuits CTR1 and CTR2 whereby such potential causes opening of the gate GC50 and allows passage through the latter of the particular locally generated signal available at that instant.

The various elements of the input mechanism will now be described in greater detail. The auxiliary store AS resembles those of the main machine CM and consists of a cathode ray storage tube 13 with its pick-up electrode 14, the derived signals from which are fed by way of amplifier 15 and read unit 16 to a write unit 17 whose output is fed to a suitable control electrode of the tube to constitute the known form of regenerative loop for maintaining continuously information stored within the device. The tube 13 of the store AS has its X-deflection plates supplied with the XTB waveform, Fig. 5 (*b*), from the waveform generator WGU associated with the machine CM. Such XTB waveform is generated in any suitable form of single stroke sawtooth waveform generator such as that shown in M. I. T. Radiation Laboratory Series, vol. 22, "C. R. T. Displays" (published 1948 by McGraw-Hill), page 134, Fig. 4.41. The Y-deflection plates of the tube 13 are supplied with a stepped Y-shift waveform as shown in Fig. 5 (*k*) derived from a Y-shift generator YSG which will be described in detail later. In consequence of these deflection voltages the tube beam traces a television type of raster consisting of eight parallel lines with each line providing storage for five character signals of four binary digits each.

In this store AS completely sequential scanning of each of the forty separate character storage locations of the eight line raster takes place during eight successive beats or minor cycle periods of operation of the machine CM due to the coordinated effects of the XTB waveform applied to the X-deflection plates of the storage tube and the shift potentials applied to the Y-deflection plates of such tube from the Y-shift generator YSG, the raster-scanning cycle being then repeated over and over again so that the store AS is effectively a circulating one in which each separate and unique storage location for each four-digit character signal is successively and repeatedly made accessible from without in a continuous cyclic manner analogous to that of the storage devices described in said reference specifications A and B.

The write unit of the store AS is provided with the usual external write input over lead 40 from gate GC50 which is of the AND type while the contents of the store may be read out over lead 39 to a further "And" type of gate GC60.

The reading device RD is indicated schematically as comprising a flat metal table 20 for supporting the card and an aligned row of forty contact brushes B0–B39 disposed at right angles to the direction A of card movement and parallel with the longitudinal dimension of the card. These brushes B0–B39 bear upon the upper surface of the card or project through the punched holes 11 therein, one for each column 12, at each of the digit-points on the card in turn as the latter is advanced forwardly in the direction of the arrow A by the card advancing mechanism indicated generally at 22. The table 20 is electrically connected to a source of negative potential while each of the brushes B0 . . . B39 is separately connected by a multiway cable 21 through an individual "And" type gate circuit GC0, GC1, GC2 ... GC39 to a single conductor 27 providing one controlling potential for the gate circuit GC50.

The card advancing mechanism 22 comprises a snail cam 41 whose contoured peripheral edge is arranged to operate upon a follower roller 42 secured to the lower arm of a two-armed lever 43 pivoted at 44. The lever 43 is urged by spring 45 to retain the cam follower 42 in contact with the cam 41. The upper end of the lever 43 is pivotally connected to a reciprocating slide 46 having an upstanding abutment 47 for engaging and propelling a record card 10 on the table 20. The cam 41 is rigidly secured upon a shaft 48 which is continuously rotated in the direction of arrow B by an electric motor 49 through a reduction gear train 50.

The rotation of shaft 48 and cam 41 causes the progressive and smooth movement of each applied record card 10 past the brushes B0 ... B39.

Associated with the card advancing mechanism 22 so as to move in timed relationship therewith is the commutator device 23 comprising a cylinder whose periphery is of insulating character inset with conductive areas 24 at various points around each of four axially spaced circumferential bands and in the manner illustrated in the development of the cylindrical surface of the drum shown in Fig. 3. The conductive areas 24 are electrically connected to a slip ring 25 engaged by a contact brush CB connected to a source of positive potential. The four parallel circumferential zones are engaged respectively by one of four contact brushes CB0, CB1, CB2 and CB3 which are each separately connected by way of a multi-way cable 28 to the dynamicisor DSR.

From the development view, Fig. 3 of the surface of the commutator 23 it will be seen that the conductive regions 24, which are shown cross-hatched, define at ten different angular spacing positions around the commutator drum, the binary system equivalents of each of the decimal digit-point values "9" to "0" when the conductive areas are assigned the binary digit value "1" and the non-conductive areas which are unhatched, the value "0." The positive potential outputs from the brushes CB0 ... CB3 accordingly have the respective significance values of $2^0$, $2^1$, $2^2$, $2^3$, in the binary scale of numbers.

The commutator 23 is so positioned upon the shaft 48 that when the brushes B0–B39 are resting upon and testing the various columns 12 of a record card 10 at, say, the digit point value "9" of the card, the corresponding region 9 of the commutator 23 is located beneath and is in contact with the brushes CB0 ... CB3. In consequence the appropriate leads of the cable 28 to the dynamicisor DSR are energised to cause the continuous emission of the binary signal (1001) representing the value "9."

The various p-pulse waveforms derived from the waveform generator WGU associated with the machine CM, one for each of the digit-intervals p0–p19 of each line scan of the store need to be modified to the form shown in diagrams (i), (j), (k) and (l), Fig. 4 constituting the $P0^1$, $P1^1$, $P2^1$ and $P3^1$ waveforms. The $P0^1$ waveform consists of a combination through the intermediary of a suitable buffer circuit or "Or" gate of the well known kind as described in the aforesaid reference of "Electronics," September 1948, pages 110–118—see particularly Fig. 2G, of the p0-pulse, the p4-pulse, the p8-pulse, the p12-pulse and the p16-pulse waveforms providing a Dash pulse in each of the first digit-interval positions of each (4-digit) character signal group in one scanning line of the store. Similarly the $P1^1$ waveform defines the second digit interval positions p1, p5, p9, p13, p17 in each of the five separate (4-digit) character signal groups, the $P2^1$ waveform the third digit positions p2, p6, p10, p14, p18 in each of such five separate character signal groups and the $P3^1$ waveform the fourth digit-interval positions p3, p7, p11, p15, p19 of each group in the scanning line. These waveforms are provided by the P-pulse generating circuits PSR which are shown in greater detail in Fig. 6.

Referring to Fig. 6, the p0-pulse, p4-pulse, p8-pulse, p12-pulse and p16-pulse waveforms are applied each through a cathode-follower buffer circuit CF1, CF2, CF3, CF4 and CF5 respectively to an "Or" type buffer gate G10 and thence by way of an amplifier A10 to a cathode-follower output stage CF6 whose output constitutes the $P0^1$ waveform of Fig. 4(i). This waveform is also applied to an inverter stage INV1 of conventional form whose output, through a cathode-follower output stage CF7, provides the paraphase version or INV $P0^1$ waveform. Similar circuits, represented only by the block symbols SC1, SC2 and SC3 provide the $P1^1$ and INV $P1^1$, the $P2^1$ and INV $P2^1$ and the $P3^1$ and INV $P3^1$ waveforms respectively, the circuits SC1 being supplied with the p1, p5, p9, p13 and p17-pulse waveforms, the circuits SC2 with the p2, p6, p10, p14 and p18-pulse waveforms and the circuits SC3 with the p3, p7, p11, p15 and p19-pulse waveforms.

The dynamicisor DSR is illustrated in detail in Fig. 9 and comprises four pentode valves V1, V2, V3 and V4 whose anodes are connected in parallel and through load resistance R1 to a source of positive anode potential.

The screen grids of each of the valves are likewise connected in parallel and through feed resistor R6 to a source of positive screen potential. Each cathode is connected to earth while each control grid is connected by way of its own grid resistance R2, R3, R4 and R5 to a source of negative potential whereby each of the valves is normally cut-off on its control grid.

In addition, however, the control grid of valve V1 is connected by way of resistor R7 to the commutator brush CB0 so that, when such brush is resting upon a conductive region of the commutator 23 the +ve potential supplied through the slip ring 25 is applied to the control grid of the valve and turns it on at such control grid. The suppressor grid of the same valve is supplied with the INV $P0^1$ waveform which, being negative except during the p0, p4, p8, p12 and p16 periods holds the anode current of the valve cut-off at its suppressor grid except during these periods even if its control-grid has been turned on.

The valves V2, V3 and V4 are similarly controlled on their control grids by the outputs from the commutator brushes CB1, CB2 and CB3 respectively and on their suppressor grids by the INV $P1^1$ waveform, the INV $P2^1$ waveform and the INV $P3^1$ waveform respectively.

During each four-digit character period the suppressor grids of the valves V1, V2, V3 and V4 are turned on sequentially, one in each digit interval but no anode current flows unless the valves have also been turned on at their control grids by the +ve potential from the commutator 23. Thus if the digit point "9" of a card 10 is being read, the brushes CB0 and CB3 alone will be energised whereby during each character period the valves V1 and V4 will respond to the turning-on of their suppressor grids by the applied $P0^1$ and $P3^1$ waveforms. In consequence negative-going pulses will be developed across the anode load resistance R1 during the first and fourth digit intervals of each character period to form the binary signal 1001 which is fed to a cathode follower output valve V5 whose output on lead 52 is applied to the gate circuit GC50, Fig. 2. This locally generated signal, representative of the particular digit-point of the record card 10 which is being read, is supplied continuously, once in each four-digit character period for as long as the brushes CB0—CB3 are resting on the "9" region of the commutator. When the card is advanced past the "9" digit point to the next, "8," digit point, the active brushes combination is changed to that of CB3 alone whereby only valve V4 is operative and the output signal from the dynamicisor becomes 0001 (reading from left to right).

The counter waveform generator CTR1 provides, upon its five separate output leads, the $Cc0$, $Cc1$, $Cc2$, $Cc3$ and $Cc4$ waveforms shown in diagrams $(m)$, $(n)$, $(o)$, $(p)$ and $(q)$ respectively of Fig. 4 and each comprising a negative-going pulse embracing the first, second, third, fourth and fifth four-digit character periods respectively in each scanning line of the store. The circuit arrangements of this counter waveform generator are shown in Fig. 7 and comprises five similar sections of which only the first is shown in detail.

This section consists of a pentode valve V6 having its cathode connected to earth; its screen-grid connected through feed resistor R8 to a source of positive screen potential and its anode connected through load resistance R9 to a source of positive anode potential. The control grid is coupled to the screen grid by way of condenser C1 and also by way of high resistance R10 to a source of positive potential whereby the valve is normally turned on and its anode is at a relatively low potential. The $p0$-pulse waveform of Fig. $4(f)$ is applied to the control grid through diode D1 and serves to cut the valve off. Due to the large grid-charge time constant the valve remains cut-off until it is turned on again by the trailing edge of the next following pulse of the $P3^1$ waveform, differentiated by the network of condenser C2 and resistance R11 and applied through diode D2. The anode potential of valve V6 is accordingly high over the period from the leading edge of $p0$-pulse to the trailing edge of the $p$-pulse in digit interval $p3$ and this output, after inversion in valve stage V7, is cathode-followed in valve V8 to provide the required $Cc0$ output waveform of Fig. $4(m)$. Similar circuits represented by the blocks SC5, SC6, SC7, and SC8 are initially triggered by the $p4$, $p8$, $p12$ and $p16$-pulse waveforms respectively and are each reset by the $P3^1$ waveform to provide the remaining output waveforms $Cc1$, $Cc2$, $Cc3$ and $Cc4$ shown in diagrams $(n)$, $(o)$, $(p)$ and $(q)$ respectively of Fig. 4. Inverse versions of each of these output waveforms are also provided, conveniently by applying the output from the first valve (V6) direct to a cathode follower stage.

The arrangements of the second counter waveform generator CTR2 are shown in Fig. 8 and comprise a pulse dividing circuit PDC which counts down in the ratio of 8 to 1 and may conveniently be of the "Phantastron" type as described in U. S. A. Patent No. 2,549,874 to F. C. Williams, filed July 21, 1947, patented April 24, 1951. The pulse input to this circuit consists of the differentiated positive-going trailing edge of the $Cc4$ waveform, Fig. 4 $(q)$ so that, once in every eight complete cycles of the circuit CTR1, an output pulse is delivered to a trigger circuit TC1 of the conventional Eccles-Jordan type as described, for example, in "Ultra High Frequency Techniques," by Brainerd et al. (published 1942 by Chapman and Hall), page 174, Figs. 4–8, through a short time delay circuit DL1 of any suitable kind, for example, an electric delay line network as described in the aforesaid reference "M. I. T. Radiation Laboratory Series," vol. 19, Waveforms (published 1949, by McGraw-Hill), chap. 22. This causes the triggering of the circuit TC1 at an instant just after the commencement of the Blackout period which immediately follows the end of each negative pulse of the $Cc4$ waveform. The trigger circuit TC1 is reset by the differentiated negative-going edge of the next following Blackout pulse occurring at the end of the following line scanning period. The trigger circuit TC1 accordingly provides on one output the $Cl0$ waveform of Fig. 5 $(c)$ and on its other output, the paraphase version or INV $Cl0$ waveform.

Resetting of the trigger circuit TC1 produces a negative-going output which after differentiation, is used as a triggering medium for a second trigger circuit TC2 which is reset by the next following Blackout pulse to provide the $Cl1$ waveform of Fig. 5 $(d)$ and its inverse version.

A similar procedure operates each of the further trigger circuits TC3, TC4, TC5, TC6, TC7 and TC8 in turn to produce the $Cl2$, $Cl3$, $Cl4$, $Cl5$, $Cl6$ and $Cl7$ waveforms of diagrams $(e)$, $(f)$, $(g)$, $(h)$, $(i)$ and $(j)$ of Fig. 5 together with their inverse versions. To ensure accurate counting by the divider circuit PDC a differentiated output from the last trigger circuit may be fed back to such circuit PDC as a resetting medium.

The Y-shift waveform for the tube 13 of the auxiliary store AS is provided by the arrangements shown in Fig. 10. These resemble the Y-scan generator described in specification C except that no provision is made for the return of the beam scanning level to a particular chosen value in between each regular step. The arrangement comprises eight similar control circuits of which only one is shown in detail. This comprises valve V10 having its anode connected by way of load resistance R12 to a source of positive anode potential and its cathode earthed. The control grid of the valve is connected to its cathode by way of resistor R13 whereby the valve is normally conducting and its anode potential on lead 54 lowered to the level of $+80$ volts at which it is caught by the diode D5. The control grid of the valve is, however, also supplied with the $Cl0$ waveform, Fig. 5 $(c)$, and is accordingly cut-off during the negative-going pulse periods of that waveform covering the first of each eight line scanning periods. When so cut-off, the anode potential of the valve V10 rises to the level of $+200$ v. where it is caught by the diode D6. The resultant change of anode potential alters the current flow through the network of resistors $R14_0$ and R15 whereby the control grid potential of a further valve V11, the Y-shift valve, is altered to produce an output voltage step across its anode resistance R16.

The remaining circuits SC10 . . . SC16 are precisely similar except for the application of the remaining waveforms $Cl1$ . . . $Cl7$ to their control grids instead of the waveform $Cl0$. In consequence, each circuit operates in turn, each dealing with one of the eight successive line scanning periods. The output leads 54 of each of these circuits is connected to the control grid of valve V11 through individual resistors $R14_1$ . . . $R14_7$. The value of the resistor $R14_1$ is made equal to $R14_0/2$, that of resistor $R14_2$ to $R14_0/3$ and so on whereby the current flow through resistor R15 is increased in unit steps as each of the successive circuits comes into operation for their related periods. The resultant anode output from valve V11 is the stepped Y-shift waveform shown in Fig. 5 $(k)$.

The gate circuits GC0 . . . GC39 may be of any suitable "And" type, for example, of the known multiple diode type. Each is provided with three controlling inputs which must all be made negative before any output is available. One input is from the related card reading brush B, i. e. B0 for gate GC0, B1 for gate GC1 and so on. The second and third inputs comprise selected ones of the output waveforms from the circuits CTR1 and CTR2 respectively. Thus gate GC0 is provided with the $Cc0$ and $Cl0$ waveforms and is accordingly conditioned to open only during the first character period of the first scanning line in every eight line cycle. Gate GC1 is controlled by the $Cc1$ and $Cl0$ waveforms and accordingly is conditioned to open only during the second character period of the first scanning line. The remaining gates are arranged similarly whereby they can open one in each of the forty character periods of the cycle.

The gate GC50 is also of any suitable "And" type and needs the simultaneous application of negative control potentials on lead 27 from one of the gates GC0 . . . GC39 and also on lead 60 before it will allow passage therethrough of the output signal from the dynamicisor DSR.

The control potential on lead 60 is for the purpose of restricting the possibility of opening gate GC50 to those, relatively small, periods when the brushes B0–B39 are in proper alignment with the digit-point positions of the card 10.

As will be seen from Fig. 1, the effective length, in the direction of movement A, of each punch hole 11 is much less than the interspacing between adjacent digit point levels.

The lead 60 is connected through parallel switch contacts 35, 36 to a further pair of parallel switch contacts 30, 31 and thence to a source of negative potential —ve. Switch contacts 30, 31 are controlled respectively by snail cams 32, 33 driven through step-up gearing 34 from the shaft 48. The gear ratio is such that the cams make one complete revolution for each advancing movement of the record card by the amount of one interdigit-point spacing. The sudden drop provided by cam 32 produces rapid closure of contacts 30 at the instant when any brush B may be opposite the leading edge of a punch hole whereas the sudden drop of cam 33 produces an equivalent rapid opening of contacts 31 at the instant when any brush B may have reached the trailing edge of a punch hole. In between these two instants the contacts 31 will have closed relatively slowly just before the contacts 30 have opened, also relatively slowly.

The switch contacts 35, 36 are controlled by snail cams 37, 38 secured directly upon the shaft 48. These contacts operate in similar manner to that of contacts 30, 31 so as to render the latter effective only during that period of card movement lying between the arrival of the brushes B at the leading edge of holes at the "9" digit-point level and the departure of such brushes from the trailing edge of holes at the "0" digit point level.

The operation of the arrangement will now be described:

Assuming the record card 10 to be on the table 20 and being moved steadily in the direction of the arrow A by the operation of the card advancing mechanism 22. The brushes B0 . . . B39 bear upon the upper surface of the card in alignment with the columns 12 and will eventually come into register with the first or "9" transverse digit-point level. At this instant the cam 37 will have allowed sudden closure of the contacts 35 and similarly the cam 32 will have allowed sudden closure of the contacts 30 whereby a negative potential is made available on control lead 60 to the gate GC50.

During all of this time the auxiliary store AS has been operating over its regenerative loop although nothing will, as yet, have been recorded in the store. The speed of operation of the store is very much faster than that of the associated card reading, each complete scanning cycle of the forty character-storage locations in the store requiring a time interval of two milliseconds only whereas the time interval required for any brush B to pass from one end to the other of any punched hole 11 is of the order of 10 milliseconds.

During each complete eight-line cycle of the store AS the combination of waveforms provided by the circuits CTR1 and CTR2 causes the application of opening potentials to the gates GC0 . . . GC39 in succession at times which are exactly coincidental with the scanning by the beam of the tube 13 of the related character storage locations of the various raster lines. This synchronisation arises automatically from the common derivation of the XTB waveform which controls the line scanning motion of the tube beam and the Y-shift potentials which control the line scanning level from generators which are fundamentally controlled by the same basic timing waveforms in the machine CM. Thus the XTB waveform, generated in the manner described in said reference specification E is synchronised by the Blackout waveform, Fig. 4 (e) to execute its flyback motion during digit periods $p20$–$p23$ of each beat and to execute its linear run down during the digit periods $p0$–$p19$. As the latter periods are themselves defined by the $p0$, $p1$ . . . $p19$-pulse waveforms from which the gate controlling waveforms $P0^1$, $P1^1$, $P2^1$ and $P3^1$ are derived, each line scan of the tube beam and hence each instant of availability of each digit storage location will be synchronised with the $P0^1$ . . . $P3^1$ gate control waveforms. In similar manner, the Y-shift potentials from Y-shift generator YSG are controlled by the same waveforms $Cl0$, $Cl1$ . . . $Cl7$ as are also used for controlling the gates GC0 . . . GC39.

When the brushes B0 . . . B39 are in register with the "9" digit-point level of the card 10 the commutator 23 will be positioned to energise brushes CB0 and CB3 whereby the dynamicisor DSR has its valves V1 and V4 (Fig. 9) made operative to transmit the binary signal 1001 in every character period. Assuming now that the card 10 shown in Fig. 1 is actually in place, then brush B0 and brush B39 will make contact with the table 20 through the aligned holes 11 and negative potential will be applied to gates GC0 and GC39. No potential will be applied to any of the other gates GC1 . . . GC38 if there are no other punch holes at the "9" digit-point level. When gate GC0 is also supplied with the coincident negative pulses of the $Cc0$ and the $Cl0$ waveforms, i. e. during the instant of scanning of the first character storage location, in the tube 13, the negative potential from the brush B0 will be communicated to the gate GC50 and the latter will open to allow the aforesaid 1001 binary signal, which is available at every character period, to pass to the write unit 17 of the store AS. Immediately this character period is finished the gate GC0 closes again and gate GC1 opens. As brush B1 is not opposite a punch hole no corresponding opening of gate GC50 occurs. Similarly gate GC39 is opened upon the simultaneous occurrence of negative pulse portions of the $Cc4$ and $Cl7$ waveforms, i. e. at the time of scanning of the last of the forty character-storage locations of the tube 13 whereupon gate GC50 is again opened to allow the transmission of the aforesaid 1001 signal from the dynamicisor DSR to the write unit 17 of the store AS.

Due to the relatively slow movement of the card compared with the complete raster scanning speed of the store AS the above described process will be repeated several times whilst the card is moving over the length of one punch hole. This is not disadvantageous since any rewriting signal will merely reinforce the previous insertion in the store while protection is afforded against the ill-effects of brush bounce or faulty contacts.

At the instant when the brushes B0 . . . B39 come to the end of the punch holes 11 at the "9" digit-point level of the record card, the cam 33 suddenly opens the contacts 31 and temporarily cuts off the supply of —ve opening potential to the gate GC50. Continued movement of the card 10 eventually brings the brushes B0 . . . B39 into alignment with the next or "8" digit-point level whereupon cam 32 again closes the contacts 30 again to supply negative potential over lead 60 to gate GC50. In similar manner to that described above with reference to the "9" digit-point level, any brush of the series B0 . . . B39 which now makes contact through a punch hole 11 with the table 20 will supply negative potential to its associated gate of the series GC0 . . . GC39. Thus with the particular card shown in Fig. 1 the brush B2 alone will contact table 20 and the gate GC2 will have negative potential applied thereto so that when this gate is opened by the simultaneous presence of the negative-going portions of the $Cc2$ and $Cl0$ waveforms it will open and allow the application of the negative potential to gate GC50 which accordingly opens and allows the passage of the signal from the dynamicisor DSR to the write unit 17 of the store AS to cause the recording of such signal in the third character storage location. The movement of the card advancing mechanism 22 has, meanwhile, altered the setting of the commutator 23 so that brush CB3 alone now rests upon a conductive element and accordingly only valve V4 (Fig. 9) of the dynamicisor DSR is turned on with the result that the output signal continuously emitted by such dynamicisor is now 0001.

In precisely similar manner each of the remaining digit-point levels of the card are deal with until every punch hole therein has been operative at one or other of such digit-point levels to open the gate GC50 in synchronism with the scanning by the beam of the tube 13 of the related character storage location of the tube raster to allow the writing in at such location of the appropriate number signal provided by the dynamicisor DSR.

When the auxiliary store AS has thus been filled the information recorded therein continues to be regenerated until transfer to the main store of the machine CM is required whereupon the gate circuit GC60 is opened by a control potential derived over lead 160 from the control unit of the machine CM by way of a static register or staticisor device in response to a particular instruction word calling for the required transfer, in the manner described in said reference specifications D, E or F. The transfer is then effected, if necessary, through known forms of decoding means which convert the auxiliary store recording, which is in the form of a binary representation of each of forty separate decimal digits, into pure binary form. Such devices form no part of the present invention and are accordingly not described. Such transference can if desired be brought about automatically at the end of card reading by suitable contacts associated with the shaft 48.

An equivalent output mechanism, i. e. for producing a punched card from an electric signal, is shown in Fig. 11. In general, this output mechanism closely resembles that of the input mechanism already described and in practice many of the elements may be common, i. e. used for either input or output purposes. The auxiliary store AS is provided, as before, together with the dynamicisor DSR, the P'-pulse generating circuits PSR, the counter circuits CTR1 and CTR2 and the gates GC0 . . . GC39. Instead of having its write input supplied by the gate GC50, however, the store AS is arranged to have its read output on lead 39 applied to one of the two inputs of a "not equivalent" circuit NEC whose function is to compare two input signals digit-by-digit and to provide an output control potential only when exact coincidence occurs. This output from the circuit NEC is applied to a gate circuit GC51 which is controlled by the cam switches 30, 31, 35, 36 and which feeds, by way of lead 27', the various gates GC0 . . . GC39. The latter gates are controlled exactly as in the first embodiment by the various combinations of the waveforms from the circuits CTR1 and CTR2 so as to open sequentially and, when so opened, the potential over the lead 27' is fed to one of forty control circuits IM0 . . . IM39 which are associated with magnet coils M0 . . . M39 which control means such as the interposer members of a suitable card punching mechanism CPM, e. g. of the known Hollerith type. The card punching arrangements may be of the form shown in U. S. A. Patent No. 1,791,950 to J. W. Bryce, filed October 19, 1925, and patented February 10, 1931, and adapted to the present invention by energisation of the magnets 160 thereof from the related control circuits IM0, IM1 . . . IM39 instead of from the sensing brushes of the earlier machine and the arrangement of the mechanism which causes the traverse of the pattern card in the earlier machine to control, instead, the operation of the cam switches 30, 31, 35 and 36 and the commutator 23.

This punching mechanism will not be described in detail, since it forms no part of the present invention. Briefly, it may comprise a series of punch bars, one for each of the columns 12 of the record card, and these are progressively moved by means indicated schematically in Fig. 11 as the shaft 48, whereby the punch heads are progressively brought into alignment with the digit-points levels "9," "8" . . . "0" of the card. Upon energisation of any magnet coil M0 . . . M39 the associated punch bar is locked by the interposer member in the particular digit-point position which it occupies at that moment and is thereafter held at that position while any remaining unlocked punch bars continue to be advanced. Finally, when all the digit-point values have been covered, a relative movement between the punch heads in their various set positions and the card 10 is produced to effect a punching at the chosen digit-point position in each of the columns 12 of the card. When punching is completed the various punch bars are then released for return to their original positions.

The "not-equivalent" circuit NEC is shown in Fig. 12 and comprises an "Or" gate consisting of the diodes D10, D11 fed respectively at terminals $x$ and $y$ through cathode follower circuits CF10, CF11 with the outputs from the dynamicisor DSR and the auxiliary store AS. The output from this "Or" gate is applied to the control grid of valve V12 arranged as a cathode follower.

The same outputs from the dynamicisor DSR and the auxiliary store AS are also applied from terminals $x$ and $y$ by way of cathode follower circuits CF12, CF13 to diodes D12, D13 which, in conjunction with resistance R16 connected to a source of negative potential, constitute an "And" gate. The output from this "And" gate is applied to the control grid of a pentode valve V13 whose cathode is connected to earth. The screen grid of the valve V13 is connected through resistance R17 to a source of suitable positive screen potential and its anode is connected through resistance R18 to a similar source of positive anode potential. The valve anode is also connected by way of diode D14 to a potential of $+100$ volts whereby the rise of anode potential of the valve is limited at that level. The suppressor grid of the valve is supplied by way of resistor R19 with the Inv. Dash waveform of Fig. 4 (b). The anode output of valve V13 is applied to the control grid of a further cathode follower valve V14.

The cathode outputs from the two separate cathode follower valves V12 and V14 are applied to two further diodes D16 and D17 respectively which have their cathodes connected together and by way of resistance R20 to a source of $-$ve potential to constitute a further "And" gate.

In the operation of the circuit so far described, a "1" digit pulse in either or both of the input signals to terminals $x$ and $y$ will pass through the "or" gate of diodes D10, D11 and will produce a negative-going pulse signal at the cathode of the valve V12. On the other hand "0" in both signals will fail to produce any negative output from the cathode of valve V12.

At the same time only the coincidence of "1" digit signals at each of the terminals $x$ and $y$ will pass the "And" gate of diodes D12 and D13. When this occurs the valve V13 will be cut-off on its control grid and the simultaneously applied Inv. Dash waveform at its suppressor grid will be ineffective to turn on anode current flow with the result that no signal will be developed at the valve anode which will remain at its limited upward level of $+100$ v. If, however, due to both of the applied signals being "0" or one "0" and the other "1," no negative output is developed across the gate resistance R16 then the valve V13 will remain turned-on at its control grid so that when the suppressor grid is released by the positive-going portion of the Inv. Dash waveform the resultant anode current flow will cause a corresponding negative-going pulse to be developed at the valve anode and this will be passed to the cathode follower valve V14 to produce a similar negative-going output to the anode of diode D17.

It will thus be seen that coincident "1" digit pulses in each signal will produce a negative output to the diode D16 and no output to the other diode D17 of the second "And" gate, while coincident "0" digits in each signal will produce no output to the diode D16 and a negative output to the diode D17. Only the coincidence of a "1" digit in one signal with a "0" digit in the other will produce the requisite negative-going output to each of the diodes D16 and D17. In consequence an output pulse from the resistance R20 is obtained only when non-equivalence exists.

It is necessary to convert this non-equivalent signal into one which provides an output potential only when each of the preceding four digits of each of the compared signals have been the same or, in other words, when no output has been derived from the "And" gate of diodes D16 and D17 during any of the four preceding digit intervals.

This is achieved by differentiating any negative-going output from the diodes D16, D17 and applying it as a triggering input to a two-stable state trigger circuit TC10. This latter is reset, if it has been triggered, by the differentiated negative-going trailing edge of the INV P3$^1$ waveform pulses which occur at the end of each character period. In consequence, any reversion of this circuit from its triggered to its reset state is an indication that at least one non-equivalence has occurred during the preceding four digit intervals. This indication is used by differentiating an appropriate output from the trigger circuit TC10 and using it as a triggering medium for a further two-stable state trigger circuit TC11 which is reset, when triggered, by the differentiated leading edge of the P'3 waveform. An output from this trigger circuit is used as a controlling medium for an "And" gate G62 which is normally held opened but which is closed by an output from trigger circuit TC11 from the end of a P'3 pulse of one character period until the beginning of the P'3 pulse of the next character period provided there is a non-equivalence between the respective four digits of the two signals on the first character period. This gate is used to control the passage of the P0$^1$ waveform to the lead 27'.

Each control circuit IM0 . . . IM39 conveniently comprises either a trigger circuit or a gas-filled discharge tube such as a thyratron which can be triggered by a pulse input and then remains in a condition which provides a current flow through its associated magnet coil M0 . . . M39 until retriggered or deionised by a suitable terminating voltage delivered in parallel to all circuits over the lead 70. This terminating voltage may be provided by the closure of cam-controlled contacts 72 immediately after card punching is completed.

The operation of this output mechanism is as follows: In the first instance the information to be read out is transferred from the main machine CM to the auxiliary store AS by appropriate control of the routing circuits within the machine to feed the signals to the write unit 17. The output transfer proper can then commence.

The moter 49 is energised to rotate the shaft 48 and thereby causes operation of the card punch mechanism CPM by lifting the various punch bars one for each of the columns 12 until they are aligned with the "9" digit-point level. At this point switches 30 and 35 are closed as in the previously described input mechanism to open the gate circuit GC51.

In the meantime the auxiliary store AS has been continuously regenerating and at the same time has presented signals representing each of the stored characters in turn to the y terminal of the "not-equivalent" circuit NEC. When the punch bars of the card punch mechanism reach the "9" digit-point level the commutator 23 conditions the dynamiciser DSR to emit the binary signal 1001 in synchronism with the scanning of each character storage location of the auxiliary store. These 1001 signals are applied to the x terminal of the circuit NEC and, whenever equivalence with the output signal from the store AS . . . occurs, an output pulse is provided which passes through the now-opened gate circuit GC51 to the lead 27' and so through the particular one of the gate circuits GC0 . . . GC39 which is open at that instant to trigger the related control circuit IM0 . . . IM39. It will be observed that the output pulse from the circuit NEC signalling the equivalence of the preceding four-digit character occurs during the time period of the next following character period and it is accordingly necessary to supply the control circuit IM associated with any one of the columns 12 of the card through the gate circuit GC0 . . . GC39 which is timed to open during the scanning of the storage location of the next following character. Thus the control circuit IM0 which is associated with the first column 12 of the card is supplied through the gate circuit GC1 which is opened during the scanning of the second of the forty character storage locations and so on.

If any control circuit of the series IM0 . . . IM39 is triggered whilst the punch bars are aligned with the "9" digit point level, the associated magnet coil M0 . . . M39 is energised and the particular punch bar controlled by that magnet coil is locked against further movement by the shaft 48 and remains aligned with the "9" digit point level of its related column 12 of the card until the subsequent completion of the punching operation.

After a short time, during which several successive scanning cycles of the store AS and the related comparison operations take place, the contacts 31, 36 are opened and movement of the punch bars which still remain unlocked takes place to align them with the "8" digit point level whereupon contacts 30, 35 reclose and the above described events again take place with comparison of the character signals read out from the store AS with the binary signal 0001 now provided by the dynamicisor DSR under the control of the commutator 23.

A similar repetition takes place at each digit point level whereafter operation of the actual punching mechanism takes place. Following this, the control circuits IM0 . . . IM39 are reset, the magnet coils M0 . . . M39 are de-energised and the mechanism returns to its initial position in readiness for the next operation.

It will be observed that neither the input or the output arrangement described depends upon any accuracy of synchronisation between the mechanically operated parts, namely, the card advancing or punching mechanism, and the electric or electrostatic elements, i. e. those of the signal generating means and the associated computer.

Various modifications may obviously be made. For example, card printing or marking may be used instead of punching with photoelectric reading of each column. The marking arrangements will be substantially identical with those illustrated in Fig. 11 for punching with the substitution of a suitable type block for each punch head and the provision of inking means such as a ribbon. Alternatively, each type bar may be provided with a set of type numbers and the output given in the form of a forty digit number in one line of printing in known manner. The photoelectric reading may be effected by means of a light source of elongated strip formation disposed below the card and operative through apertures in the card-supporting table surface to illuminate the underside of the card while above the card with suitable masking apertures in alignment with the various digit points are provided a series of photoelectric cells, one for each column. The outputs from these cells control the related gate circuit of the series GC0 . . . GC39 so as to open such gate circuit when the cell is illuminated. In an alternative arrangement for effecting photoelectric reading of printed or marked cards reflection of light from a light source above the card onto separate photoelectric cells may be utilised.

The form of the auxiliary store AS is not restricted to that of the electrostatic type described since any continuously circulating type of store could be used. A magnetic store such as a magnetic drum or a store of the supersonic mercury delay line type is suitable provided its circulation time is appropriately adjusted. Instead of using a separate auxiliary store, a storage device of the associated computing machine may be used.

The invention clearly has applications other than to digital computing machines since it may be used in conjunction with other devices operated with the aid of or under the control of punched or marked cards.

We claim:

1. Information translating apparatus for translating information recorded as a number of separate character-defining indications in different columns on a record sheet into electric signals which comprises a source of timing signals, an electric signal storage device with input and output terminals and having a plurality of separate storage locations equal in number to the number of different columns on the record sheet and each capable of storing an electric signal suitable for defining any one particular position out of a number of unique positions available in any one of said columns, storage location selecting apparatus controlled by signals from said source of timing signals for continuously rendering each one of said storage locations externally available in turn and in a continuously repetitive cycle, a plurality of testing devices operative upon said record sheet and in alignment one with each of said columns at a similar position in each column and providing an output signal when opposite a character-defining indication in such column, shifting means for bringing each of the column positions in turn, into alignment with the testing device for such column, electric signal generating means controlled by signals from said source of timing signals and by said shifting means for providing a plurality of groups of electric signals, the form of the signals in each group being controlled by said shifting means and being characteristic of the particular column position at which said testing devices are instantly operative and the timing of each signal in each group being controlled by said timing signals to occur respectively in synchronism with a time when each successive storage location in said storage device is rendered externally available, signal controlled switching means connected in a circuit between said electric signal generating means and said input terminal of said signal storage device, said switching means having a plurality of separate control circuits, one for each of said testing devices, said control circuits being controlled by said timing signals and by said testing devices to close said switching means during those time periods when the particular storage location appropriate to each column is rendered available in coincidence with a character defining indication in such column being opposite the related testing device whereby a signal appropriate to the indicated character in each column of said sheet is passed from said signal generating means to said storage device for recording in the related storage location thereof.

2. Information translating apparatus for translating information recorded as a number of separate digit-point markings in different columns on a record card into electric signals which comprises a source of timing signals, an electric signal storage device having a signal input terminal and a plurality of separate storage locations at least equal in number to the number of different columns on the record card, each storage location being capable of storing an electric signal suitable for defining any one of the particular digit point levels in said columns, storage location selecting apparatus controlled by signals from said source of timing signals for continuously rendering each one of said storage locations externally available in turn and in a continuously repetitive cycle, a plurality of card testing devices operative upon said record card in alignment one with each of said columns at a similar digit-point level in each column, said testing devices each having an individual output lead upon which a signal is present when the related testing device is opposite a digit-point marking in its column, step-by-step shifting means for moving said record card past said testing devices so as to bring each of the digit-point levels in turn, into alignment with the testing devices, electric signal generating means controlled by said signals from said source of timing signals and by said shifting means for providing a plurality of groups of electric signals, the form of the signals in each group being controlled by said shifting means and being characteristic of the particular digit-point level at which said testing devices are instantly operative and the timing of each signal in each group being controlled by said timing signals to occur in synchronism with a time when each successive storage location in said storage device is rendered externally available, a plurality of separate signal controlled switching means, one for each of said testing devices, said switching means being controlled by said timing signals to close sequentially in synchronism with the time period when the storage location in said storage device appropriate to the related testing device is externally available, circuit means between said electric signal generating means and said input terminal of said storage device, said circuit means including a signal-controlled switching device having a control terminal and circuit connections from the output lead of each testing device through its related switching means to said control terminal of said switching device to cause the supply of digit-point signals to said storage device under the control of said testing devices.

3. Translating apparatus for translating information recorded as a number of separate character defining punchings at different levels in different columns on a card into electric signals which comprises a source of timing signals, an electric signal storage device having a plurality of separate storage locations at least equal in number to the number of columns in said card and each capable of storing a signal characteristic of any chosen one of the number of different positions available in each of said columns of said card, storage location selecting means controlled by said timing signals for rendering each of said storage locations externally available in turn in a continuous cyclical manner, a plurality of aligned punch hole detecting devices one for each column on said card, each detecting device causing a circuit closure when opposite a punch hole in said card, means for effecting relative movement of said card with respect to said punch hole detection devices so as to present each of said column levels in turn to the related punch hole detecting device for such column, electric signal generating means controlled by said timing signals and by said card moving means for providing a series of electric signals comprising blocks of repeated signals, the form of each repeated signal in each block being controlled by said card moving means to be characteristic of the column level at which the card is located at any time and the timing of each signal in each block being controlled by said timing signals so as to be repeated once for each column of said card in synchronism with the time at which the related storage location in said storage device is available for operation, circuit connections between said signal generating means and said storage device, said circuit connections including a signal controlled gate circuit which is normally closed and opened only by an applied signal and cyclically operated selector switch means controlled by said timing signals for connecting each of said hole detector devices to said gate circuit in turn to apply the detector device output as a gate control medium during the time periods when the storage location related to each hole detector device is externally available.

4. Information translating apparatus for translating information recorded as a number of separate character-defining indications in different columns on a record sheet into electric signals which comprises a source of timing signals, an electric signal storage device having a plurality of separate storage locations equal in number to the number of different columns on the record sheet and each capable of storing an electric signal suitable for defining any one particular position out of a number of unique positions available in any one of said columns, storage location selecting apparatus controlled by said timing signals for continuously rendering each one of said storage locapetitive cycle, a plurality of indication detecting means operative upon said recording sheet and in alignment, one with each of said columns at a similar position in each column, shifting means for bringing each of the column positions in turn into alignment with the related indication detecting means for such column, electric signal generating means controlled by said timing signals and by said shifting means for providing a plurality of groups of electric signals, the form of the signals in each group being controlled by said shifting means to be characteristic of the particular column position at which said indication detecting means is instantly operative and the timing of said signals being controlled by said timing signals to occur in synchronism with a time when a storage location in said storage device is rendered externally available, a transfer channel between said signal generating means and said storage device, said channel including cyclically operated selector switching means controlled by said timing signals and by said indication detecting apparatus.

5. Information translating apparatus as claimed in claim 4 in combination with an electronic digital computing machine having a cyclic operating rhythum characterised in that said source of timing signals is that which controls the operating rhythm of said computing machine.

6. Information translating apparatus as claimed in claim 5 in which said electronic digital computing machine includes a main data storage device of a chosen specific type and in which said storage device of said information translating apparatus is of identical type and controlled by the same rhythm control means as said main data storage device.

7. Information translating apparatus as claimed in claim 4 in which said storage device is of the cathode ray tube type and includes beam deflection control apparatus providing at least one linear scan of the tube beam.

8. Information translating apparatus as claimed in claim 4 in which each of said electric signals provided by said electric signal generating means comprises a pulse signal train representative of a binary number which characterises the column position.

9. Information translating apparatus as claimed in claim 4 in which said electric signal generating means includes a movable commutator type switching device mechanically interconnected with said shifting means.

References Cited in the file of this patent

UNITED STATES PATENTS

| | | |
|---|---|---|
| 2,318,591 | Couffignal | May 11, 1943 |
| 2,405,287 | Brand et al. | Aug. 6, 1946 |
| 2,528,101 | Williams | Oct. 31, 1950 |
| 2,547,482 | McKiever | Apr. 3, 1951 |
| 2,549,071 | Dusek | Apr. 17, 1951 |
| 2,587,014 | Vroom | Feb. 26, 1952 |
| 2,604,262 | Phelps et al. | July 22, 1952 |
| 2,611,538 | Hatton | Sept. 23, 1952 |

OTHER REFERENCES

"A Storage System for Use With Binary-Digital Computing Machines," by Willams et al., Proceedings of the Institute of Electrical Engineers, March 1949, pages 81 to 100.

"Universal High Speed Digital Computers," by Williams et al., Proceedings of the Institute of Electrical Engineers, vol. 98, No. 61, February 1951, pages 13 to 34.